United States Patent [19]

Loranger et al.

[11] 4,122,470
[45] Oct. 24, 1978

[54] HINGED MULTIPLE EXPOSURE MATBOX ATTACHMENT FOR CAMERAS

[76] Inventors: Robert C. Loranger, 7426 E. Parkway, Sacramento, Calif. 95823; Marvin E. Sackett, 5430-A Garfield Ave., Sacramento, Calif. 95841

[21] Appl. No.: 681,142

[22] Filed: Apr. 28, 1976

[51] Int. Cl.² ............................................. G03B 11/00
[52] U.S. Cl. ...................................... 354/122; 354/295
[58] Field of Search ............... 354/122, 123, 124, 125, 354/120, 295, 296; 355/71, 74

[56] References Cited

U.S. PATENT DOCUMENTS

| | | | |
|---|---|---|---|
| 1,103,745 | 7/1914 | Farquhar | 354/125 |
| 1,368,761 | 2/1921 | Schlegel | 354/122 |
| 1,510,410 | 9/1924 | Menyhart et al. | 354/122 |
| 1,575,990 | 3/1926 | Hays | 354/125 |
| 1,715,593 | 6/1929 | Coan | 354/125 |
| 2,186,610 | 1/1940 | Leavitt et al. | 354/122 |
| 3,135,184 | 6/1964 | Siebenberg | 354/122 |
| 3,719,128 | 3/1973 | Simmons | 354/122 |
| 3,940,775 | 2/1976 | Bodnar | 354/122 |
| 3,959,803 | 5/1976 | Marvel | 354/125 |

*Primary Examiner*—L. T. Hix
*Assistant Examiner*—Alan Mathews
*Attorney, Agent, or Firm*—Blair, Brown & Kreten

[57] ABSTRACT

An attachment for use on a camera to make it possible to make photo montages by taking separate pictures on different areas of the same film, embodying a matbox comprising a box to be secured to the camera lens having hinged blinds to selectively mask portions of film in the camera so that the masked portion of the film will remain unexposed until, by operation of the blinds, the formerly masked portions are selected, and further pictures may be taken without reference to the first picture which is masked.

5 Claims, 10 Drawing Figures

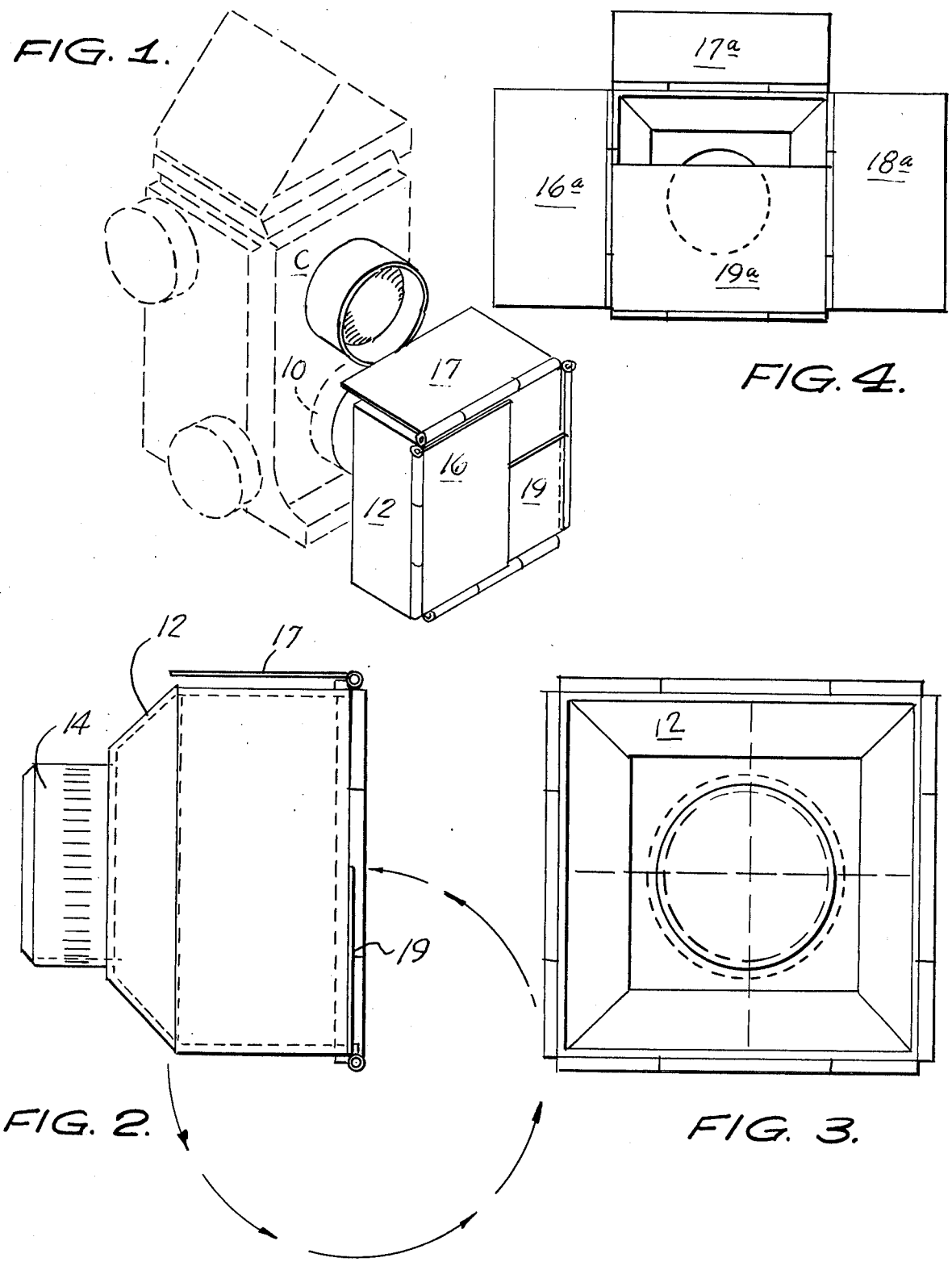

HINGED MULTIPLE EXPOSURE MATBOX ATTACHMENT FOR CAMERAS

BACKGROUND OF THE INVENTION

Field of the Invention

Summary of the Invention

It is known that by use of masking devices film in a camera may be used to make separate pictures, each picture being recorded on a portion of the film that is not masked at the time of each exposure. Previously known masking devices have, however, been complicated and difficult to use.

It is an object of the present invention to make it possible for a relatively unskilled amateur with an ordinary camera to make more than one exposure on a single negative quickly and accurately so that the multiple exposures will appear on a single print from the negative, the result being similar to a photo montage.

Other objects and advantages will become apparent in the following specification when considered in light of the attached drawings.

BRIEF DESCRIPTION OF THE DRAWINGS

FIG. 1 is a perspective view of a camera with the attachment of the present invention mounted thereon arranged to take a picture on one quarter of the film in the camera;

FIG. 2 is a side view of the invention as seen in FIG. 1;

FIG. 3 is a front view of the device with all of the blinds open to take a single picture covering the entire film in the camera;

FIG. 4 is a front view showing that differently proportioned blinds may be used as two thirds, one third, etc. instead of half and half;

DESCRIPTION OF THE PREFERRED EMBODIMENTS

Figure 5:
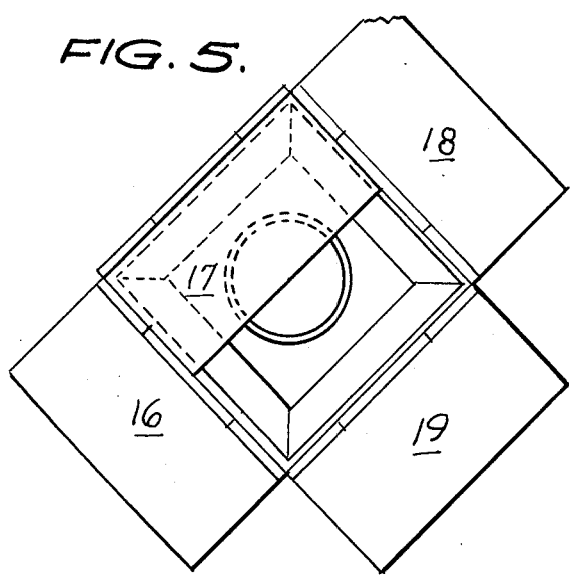
FIG. 5 shows the device of the invention as seen in FIGS. 1, 2 and 3 with one blind closed and the device turned to take a picture on half of the film as seen in FIG. 6.

The device is of the utmost simplicity as is clear from FIGS. 1, 2 and 3. A camera C has the conventional lens mount 10 projecting from its front. This conventional lens mount will ordinarily provide the means to mount the device of the present invention on the camera. Since the specific means to hold the device in place is not an inventive feature, it is noted that any appropriate conventional means may be used.

A box 12 is provided with a cylindrical socket element 14 to engage over the lens mount 10 to support the box centered in position in front of the lens. The edges of box 12 must be positioned outwardly from the axis of the lens beyond the angle of the lens so that it cannot in any way restrict the area covered by the lens.

In the form shown in FIGS. 1-3 each edge of box 12 is provided with a hinged mask or blind 16, 17, 18, 19, each of which when folded to overlie the open side of box 12, will extend slightly beyond the center of the box.

As seen in FIG. 4 the lower blind 19a which in this case masks off two thirds of the area of the film, is folded upwardly to overlie box 12 and it will be understood the blind 19 extends slightly beyond two thirds of the area covered by the camera lens. With blind 19a closed, if the camera shutter is operated only one third of the negative will be exposed which will be the portion of the lower side of the negative directly behind blind 19a. When blind 19a is open and blind 17a closed a picture will be taken covering two thirds of the negative. Blinds 16a and 18a may be used to subdivide the two thirds of the film in half or the one third of the film in half, or both. It must be remembered that only one area of the film is to be exposed at a time so the subdivisions of the picture must be decided upon prior to the first exposure.

The box 12 in each case is proportioned to agree with the shape of the negative to be exposed; a square negative calls for a square box; a three by five negative would call for a rectangular box having sides proportioned three to five, etc.

If a picture of four friends is desired, using the device of FIGS. 1, 2 and 3, the blinds covering half of the lens, a picture of the head and shoulders of each may be taken, one person pictured in each quarter of the negative. From FIG. 1 it is seen that blind 16 may be folded over blind 19 leaving the upper righthand part of box 12 in FIG. 1 open. A picture is then taken of one of the friends. If, then, blind 16 is folded away and blind 18 folded over blind 19, the upper lefthand part of box 12 in FIG. 1 will be open and a picture of a second of the friends is taken. Then blind 19 is folded away and blind 17 is folded down and the two other friends are each photographed, one with blind 16 folded over blind 17 and the other with blind 18 folded over blind 17.

Figure 6:
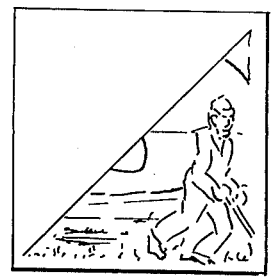
FIG. 6 is the picture taken with the device when used as shown in FIG. 5.

FIGS. 5 and 6 illustrate that the device may be rotated to divide the resultant picture on a diagonal, FIG. 5 showing how the device is mounted, and FIG. 6 showing a picture one half of which has been exposed.

Figure 7:
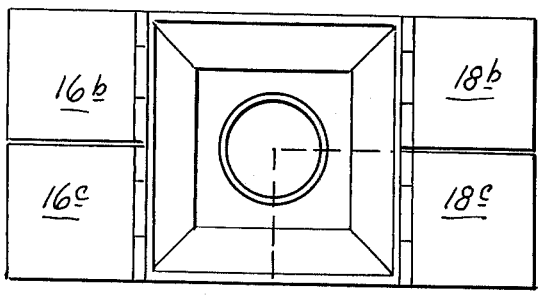
FIG. 7 shows a front view of a device of the present invention having a different arrangement of blinds.
Figure 8:
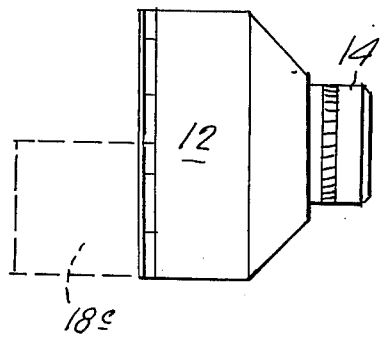
FIG. 8 is a side view of the device of FIG. 7.

FIGS. 7 and 8 show the device having four blinds 16b, 16c and 18b and 18c but differently arranged than in FIGS. 1, 2 and 3 and of a smaller size. It is noted in this connection that the device of FIGS. 1, 2 and 3 may be made using smaller blinds. For instance one blind at 16 extends from the top lefthand corner of box 12, (facing the box 12 as in FIG. 3) to just slightly more than half the distance to the lower lefthand corner of the box. A blind corresponding to blind 17 would be hinged to the top edge of the box 12 to extend from the upper righthand corner to slightly beyond half the distance to the upper lefthand corner. Similarly a blind corresponding to blind 18 would be hinged to the righthand edge of box 12 to extend to slightly more than halfway along the righthand edge of the box, and a blind corresponding to blind 19 would be hinged at the lower lefthand corner of the box to be folded upwardly when in use. These blinds would each extend along a side of the box slightly more than half the length of the side to which it is hinged and have a length slightly more than half the length of the side of the box.

Figure 9:
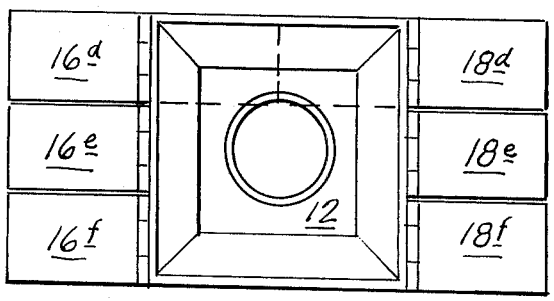
FIG. 9 is a front view of a device of the present invention arranged to make possible the taking of six pictures on the same film.
Figure 10:
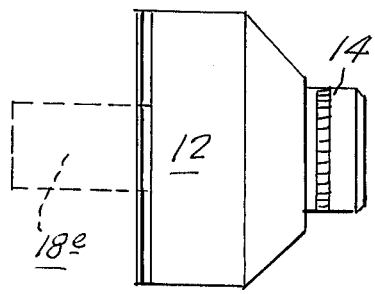
FIG. 10 is a side view of the device of FIG. 9.

FIGS. 9 and 10 show another variation of the device having three blinds 16d, 16e and 16f, and blinds 18d, 18e and 18f. In this case the picture may be made in sixths or thirds or combinations.

The manner of use of the blinds of FIGS. 9 and 10 is the same as for use of the blinds in the other examples, and all of the blinds are used except the one or more necessary to be open to expose the desired area of the film.

Having thus described the preferred embodiment of the invention it should be understood that numerous structural modifications and adaptations may be resorted to without departing from the spirit of the invention.

What is claimed is:

1. An attachment for a camera for making plural photographs on a single exposure film roll element in a camera by taking multiple exposures comprising a cylindrical socket element of a dimension suitable to overlie and snugly engage a lens mount on the exterior of the camera, a substantially rectangular box, a tapering portion connecting said socket to said box comprising four sides which connect to said tapering portion and have an open front face and rear face whereby said tapering portion connects to said rear face along its outer periphery, and a plurality of mask elements disposed on hinges about at least a portion of an outer periphery of said open front face so that when at least one mask element is disposed along the open front face of said box, a portion of the picture then taken will be similarly masked and unexposed, said masks comprised of sufficient dimension such that when all masks are disposed over the front face the front face is completely shielded and when the mask elements are not disposed over the front face they can be moved to overlie the outer portion of the sides of said box so as to provide a ready externally visible indication of which masks are being utilized.

2. The attachment for a camera as recited in claim 1 in which four masks are provided, each pivoted to a different side of said box whereby four separate pictures may be made successively on a single film, or more than one said mask may be deployed at anyone time.

3. The attachment for a camera as recited in claim 1 in which four masks are provided and two of said masks are pivoted to one side of said box and the other two being pivoted to the opposite side of said box, so that one or more of said blinds can be deployed.

4. The attachment for a camera as recited in claim 1 in which a plurality of masks are pivoted some to one side of said box, and the remainder pivoted to the opposite side of said box, the masks pivoted to each side of said box being together sufficient, when closed, to mask half of said film.

5. The attachment for a camera as recited in claim 1 in which the mask pivoted to one side of said box masks more than one half of the area of the film in the camera when in position overlying said box and the mask pivoted to the other side of the box masks the remainder of the area of the film when positioned to overlie said box, whereby two pictures may be taken having areas proportioned to the proportions of said two masks.

* * * * *